US012421867B2

(12) United States Patent
Scheitlin

(10) Patent No.: US 12,421,867 B2
(45) Date of Patent: Sep. 23, 2025

(54) SYSTEM AND METHOD FOR DETERMINING PROBABILISTIC BURST

(71) Applicant: General Electric Company, Schenectady, NY (US)

(72) Inventor: Gordon G. Scheitlin, Liberty Township, OH (US)

(73) Assignee: General Electric Company, Evendale, OH (US)

(*) Notice: Subject to any disclaimer, the term of this patent is extended or adjusted under 35 U.S.C. 154(b) by 347 days.

(21) Appl. No.: 17/966,499

(22) Filed: Oct. 14, 2022

(65) Prior Publication Data

US 2024/0125247 A1 Apr. 18, 2024

(51) Int. Cl.
*F01D 21/04* (2006.01)
*F01D 21/00* (2006.01)

(52) U.S. Cl.
CPC ........... *F01D 21/04* (2013.01); *F01D 21/003* (2013.01); *F05D 2260/80* (2013.01); *F05D 2270/304* (2013.01); *F05D 2270/44* (2013.01); *F05D 2270/71* (2013.01)

(58) Field of Classification Search
CPC ........ F01D 21/003; F01D 21/02; F01D 21/00; F01D 17/06; F01D 21/04; F01D 5/02; F05D 2270/304; F05D 2270/02; F05D 2270/091; F05D 2270/021; F05D 2270/09
See application file for complete search history.

(56) References Cited

U.S. PATENT DOCUMENTS 6,226,597 B1 5/2001 Eastman
7,162,373 B1 * 1/2007 Kadioglu .............. F01D 21/003 702/35
8,042,406 B2 10/2011 Rosenfield
10,233,771 B2 3/2019 Boerlage
10,288,037 B2 5/2019 Cosack
(Continued)

FOREIGN PATENT DOCUMENTS

CN 102184306 A * 9/2011
CN 103162924 A * 6/2013
(Continued)

OTHER PUBLICATIONS

Lee. Stress-Strength Interference Models In Reliability. Master's Thesis. Kansas State University. (Year: 1989).*
(Continued)

*Primary Examiner* — Topaz L. Elliott
(74) *Attorney, Agent, or Firm* — Dority & Manning, P.A.

(57) ABSTRACT

Systems and methods are provided herein that are useful to determining probabilistic burst for a component. In particular, the systems and methods generate an overspeed distribution for the component, the overspeed distribution being indicative of a probability that various overspeed values will be obtained. The method involves receiving field analytics data indicative of time the component spends in at least one operating condition and receiving overspeed data indicative of overspeed values for the component as a function of the at least one operating condition. The method further includes generating an overspeed distribution for the component based on the field analytics data and the overspeed data. A probability of burst for the component may then be determined based on the overspeed distribution.

20 Claims, 8 Drawing Sheets

(56) References Cited

U.S. PATENT DOCUMENTS

| | | | | |
|---|---|---|---|---|
| 11,181,897 | B2 * | 11/2021 | Miyagi | G05B 23/0283 |
| 2007/0005527 | A1 * | 1/2007 | Parthasarathy | G06F 30/23 706/15 |
| 2010/0313669 | A1 * | 12/2010 | Rosenfield | G01M 99/004 73/802 |
| 2017/0191374 | A1 | 7/2017 | Boettner | |
| 2018/0003154 | A1 | 1/2018 | Deshpande | |
| 2019/0294157 | A1 * | 9/2019 | Miyagi | G06N 7/01 |
| 2021/0270276 | A1 | 9/2021 | Wu | |
| 2022/0049681 | A1 | 2/2022 | Esbensen | |

FOREIGN PATENT DOCUMENTS

| | | | |
|---|---|---|---|
| CN | 106777814 B * | 7/2020 | G06F 30/15 |
| FR | 3132279 | 8/2023 | |
| JP | 2019168274 | 10/2019 | |

OTHER PUBLICATIONS

Toksoy. Stress Strength Interference: Over Design Costs Money, Variation is the Enemy!. Load & Strength Interference Seminar. (Year: 2012).*

French Application No. FR2112278, Filed Nov. 19, 2021, Title: Module for Assembling a Fan Blade of a Turbomachine, (Ref. B-024469).

French Application No. FR2109526, Filed Sep. 10, 2021, Title: Flexibilities in a geared gas turbine engine, (Ref. B-024242).

French Application No. FR2109530, Filed Sep. 10, 2021, Title: Flexibilities in a geared gas turbine engine, (Ref. B-024243).

French Application No. FR2109787, Filed Sep. 17, 2021, Title: Aircraft Turbine Engine With an Off-Axis Propeller, (Ref. B-024794).

French Application No. FR2112280, Filed Nov. 19, 2021, Title: Assembly With Variable Setting for a Fan of a Turbomachine, (Ref. B-024468).

French Application No. FR2112486, Filed Nov. 25, 2021, Title: Electric Energy Conversion and Transport System for the Internal Hybridization of an Aircraft Turbo-Engine, (Ref. B-025286).

French Application No. FR2112509, Filed Nov. 25, 2021, Title: Device for Pressurizing a Turbomachine Enclosure With a Curvic Coupling Passage, and Corresponding Turbomachine, (Ref. B-0250350).

French Application No. FR2112705, Filed Nov. 30, 2021, Title: Turbomachine Comprising a Lubrication Enclosure and a Speed Reducer, (Ref. B-024542).

French Application No. FR2112869, Filed Dec. 2, 2021, Title: Turbine engine comprising an electric machine downstream from a turbine shaft and driven by this shaft, (Ref. B-025037).

French Application No. FR2113100, Filed Dec. 7, 2021, Title: Cooling-air distribution case, (Ref. B-024474).

French Application No. FR2113361, Filed Dec. 13, 2021, Title: Turbomachine for an Aircraft Comprising an Electric Machine, (Ref. B-025039).

French Application No. FR2113552, Filed Dec. 15, 2021, Title: Method for managing the torque of a turbomachine, (Ref. B-025059).

French Application No. FR2113845, Filed Dec. 17, 2021, Title: Aircraft Turbomachine, (Ref. B-025396).

French Application No. FR2113847, Filed Dec. 17, 2021, Title: Aircraft Turbomachine, (Ref. B-025189).

French Application No. FR2113949, Filed Dec. 20, 2021, Title: Turbomachine Module Equipped With a Pitch Change System and a Fluid Transfer Device, (Ref. B-024662).

French Application No. FR2113951, Filed Dec. 20, 2021, Title: Turbomachine Module Equipped With Variable Pitch Vanes and an Annular Interface Shroud, (Ref. B-023792).

French Application No. FR2113952, Filed Dec. 20, 2021, Title: Turbomachine Module Equipped With Variable Pitch Vanes and Oil Transfer Device, (Ref. B-023793).

French Application No. FR2113953, Filed Dec. 20, 2021, Title: Turbomachine Module Equipped With a Pitch Change System and a Fluid Transfer Device With Blind Sleeving, (Ref. B-024657).

French Application No. FR2113966, Filed Dec. 20, 2021, Title: Fluid Transfer Device With Hydraulic and Mechanical Connection Means, (Ref. B-024661).

French Application No. FR2114236, Filed Dec. 22, 2021, Title: Turbine Engine Subassembly Including a Gooseneck With an Improved Configuration and Turbine Engine Including a Subassembly of This Type (Ref. B-024601).

French Application No. FR2114272, Filed Dec. 22, 2021, Title: Aircraft Turbine Engine Comprising Blade Pitch Control Using Local Pressure Measurements, (Ref. B-024494).

French Application No. FR2200883, Filed Feb. 1, 2022, Title: Method for managing the torque of a turbomachine, (Ref. B-025105).

French Application No. FR2201260, Filed Feb. 14, 2022, Title: Propulsion unit for aircraft comprising a gas turbine engine and an electrical machine mounted in an enclosure with a cooling system comprising a main coupling member, method for using such a unit, (Ref. B-025173).

French Application No. FR2201266, Filed Feb. 14, 2022, Title: Gas turbine engine assembly comprising a housing with half-shells bearing variable pitch inlet stator vanes, (Ref. B-024190).

French Application No. FR2202171, Filed Mar. 11, 2022, Title: Propulsion System for an Aircraft, (Ref. B-025595).

French Application No. FR2202172, Filed Mar. 11, 2022, Title: Aeronautical Thruster, (Ref. B-025596).

* cited by examiner

600

SYSTEM AND METHOD FOR DETERMINING PROBABILISTIC BURST

GOVERNMENT INTERESTS

This invention was made with government support under FA8650-15-D-2501 awarded by the Department of Defense. The Government has certain rights to this invention.

TECHNICAL FIELD

The present disclosure relates generally to jet engines and more particularly to burst requirements for turbine disks of jet engines.

BACKGROUND

The design of gas turbine engine components, especially rotating components such as turbine disks, may be driven by burst and/or yield limits. Since turbine rotors can reach speeds above their maximum design intent due to various causes, such as shaft separation or control system failure, engine design specifications include an overspeed requirement typically (historically) given deterministically as a percent of the maximum design intent. New engine specifications, especially in military engines, may provide overspeed requirements in probabilistic terms. The intent is to minimize the possibility of component burst in the unlikely event of a rotor overspeed. Determining the burst limits ensures that turbine components are designed with enough margin against burst.

BRIEF DESCRIPTION OF THE DRAWINGS

Various needs are at least partially met through provision of the systems and methods for calculating probabilistic burst described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
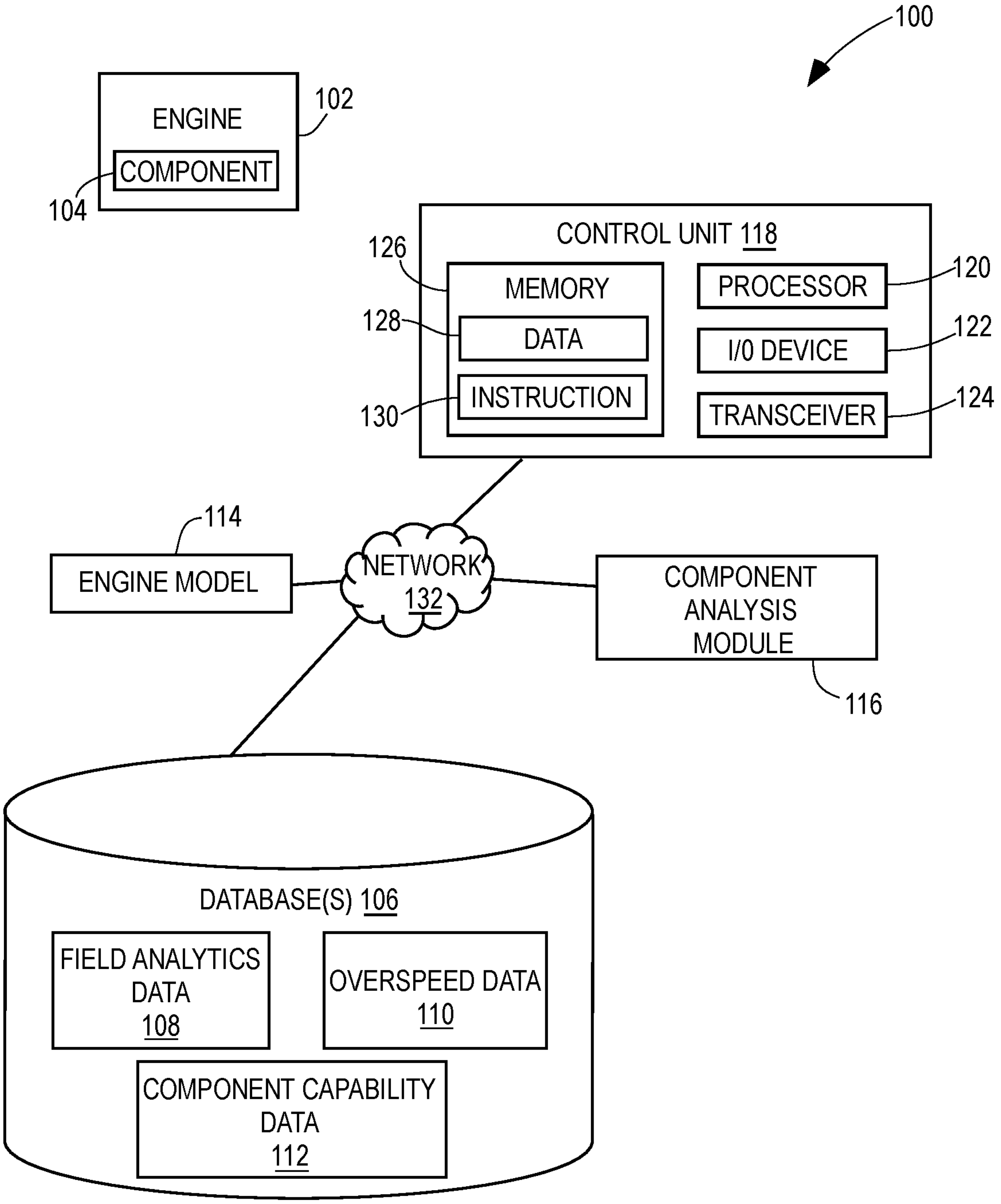
FIG. 1 comprises a schematic diagram of an exemplary system for calculating probabilistic burst in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Two inputs are generally used to perform probabilistic burst calculations. The first input is a rotor overspeed distribution that provides a probability that the rotor will obtain various overspeed values during engine operation. The second input is a disk capability distribution that provides a probability or likelihood that the component will be capable of withstanding a particular speed without burst should the speed be obtained. The disk capability distribution is determined based on material specimen tests that, for example, test the yield performance of a particular turbine disc at various operating speeds. The methods and systems described herein relate to generating a rotor overspeed distribution from controlled failures and, in particular, relate to generating a probability distribution of rotor overspeed. The rotor overspeed distribution may then be used to perform probabilistic burst calculations for a turbine disk.

It is also contemplated that the systems and methods described herein may be applied to any system where burst requirements may be determined probabilistically, such as systems including rotating hardware. For example, the systems and methods described herein may also be used to perform probabilistic burst calculations for an electric motor generator or other component of a hybrid electric engine. In some approaches, the probability of burst may be useful to designing a component or part of a hybrid electric engine.

Current methods of determining the burst for turbine disks use deterministic approaches. Deterministic approaches provide a theoretical estimate of the rotor overspeed distribution and are based on extensive and costly testing. Further, deterministic approaches can be less accurate and overly conservative, resulting in heavier components, or the use or more exotic materials, increasing costs for both production and operation. These are all significant challenges in the context of aviation application settings.

Generally speaking, the various aspects of the present disclosure can be employed to provide an input for probabilistic burst calculations. Various aspects of the present disclosure provide the rotor overspeed distribution needed to perform probabilistic burst calculations. Probabilistic approaches to calculating burst generate a realistic, data supported rotor over speed distribution, rather than an estimate. Designing components such as turbine disks to a probabilistic burst requirement may open additional design margins and support more optimized designs to provide weight and cost savings that can also lead to reduced costs of operation. Improving the design of a major component such as a turbine disk may also lead to follow-on improvements to other hardware such as mating shafts or other connecting components.

As used herein, overspeed of a component refers to a condition in which a component rotates at a speed beyond its design limit. A percent (%) overspeed refers to the percent by which the rotational speed of the component exceeds its design limit. While % overspeed is referred to herein, it is also contemplated that other metrics, such as rotations per minute (rpms), for quantifying the degree of overspeed may be employed. For example, maximum rotor speed in rpms may be a design specification for a component and such a value may be used to quantify a degree of overspeed for that component.

As used herein, burst refers to mechanical overload rupture of a component where stresses exceed the material capability of the component.

In some approaches, a system for determining probabilistic burst for a component comprises at least one processor configured to integrate an overlapping area of a component capability distribution and an overspeed distribution and a memory device. The memory device stores instructions that when executed by the at least one processor causes the at least one processor to perform operations. The at least one processor is configured to: receive field analytics data indicative of time the component spends in at least one operating condition; receive overspeed data indicative of overspeed values for the component as a function of the at least one operating condition; generate an overspeed distribution for the component based on the field analytics data and the overspeed data, the overspeed distribution providing a probability of overspeed as a function of overspeed value; and determine a probability of burst for the component based on an integration of the overlapping area.

In some approaches, a computer-implemented method comprises executing, by a processor configured to integrate an overlapping area of a component capability distribution and an overspeed distribution. The executing includes receiving, by the processor, field analytics data indicative of an amount of time a component spends in at least one operating condition. The executing further includes receiving, by the processor, overspeed data indicative of overspeed values for the component as a function of the at least one operating condition. Executing also includes generating, by the processor, the overspeed distribution for the component based on the field analytics data and the overspeed data, the overspeed distribution providing a probability of overspeed of the component as a function of overspeed value. The executing also includes determining, by the processor, a probability of burst for the component based on the integration of the overlapping area.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "attached to," and the like refer to both direct coupling or attaching, as well as indirect coupling or attaching through one or more intermediate components or features, unless otherwise specified herein.

The singular forms "a", "an", and "the" include plural references unless the context clearly dictates otherwise.

The foregoing and other benefits may become clearer upon making a thorough review and study of the following detailed description. Referring now to the drawings, and in particular to FIG. 1, a system 100 that is compatible with many of these teachings will now be presented.

The system 100 may be employed to calculate probabilistic burst for a component 104 of an engine 102. In some aspects, the component 104 is a fan, compressor, or turbine disk (e.g., a turbine disk in a high pressure turbine, low pressure turbine, or power turbine) in a gas turbine engine. The turbine disk is generally the largest component by weight and size of the high-pressure rotors in a gas turbine engine and, accordingly, may benefit from the probabilistic burst calculation systems and methods described herein. However, it is also contemplated that the systems and methods described herein may be applied to other gas turbine engine components. The system 100 includes one or more databases 106, an engine model 114, and a component analysis module 116, and a control unit 118.

Figure 4:
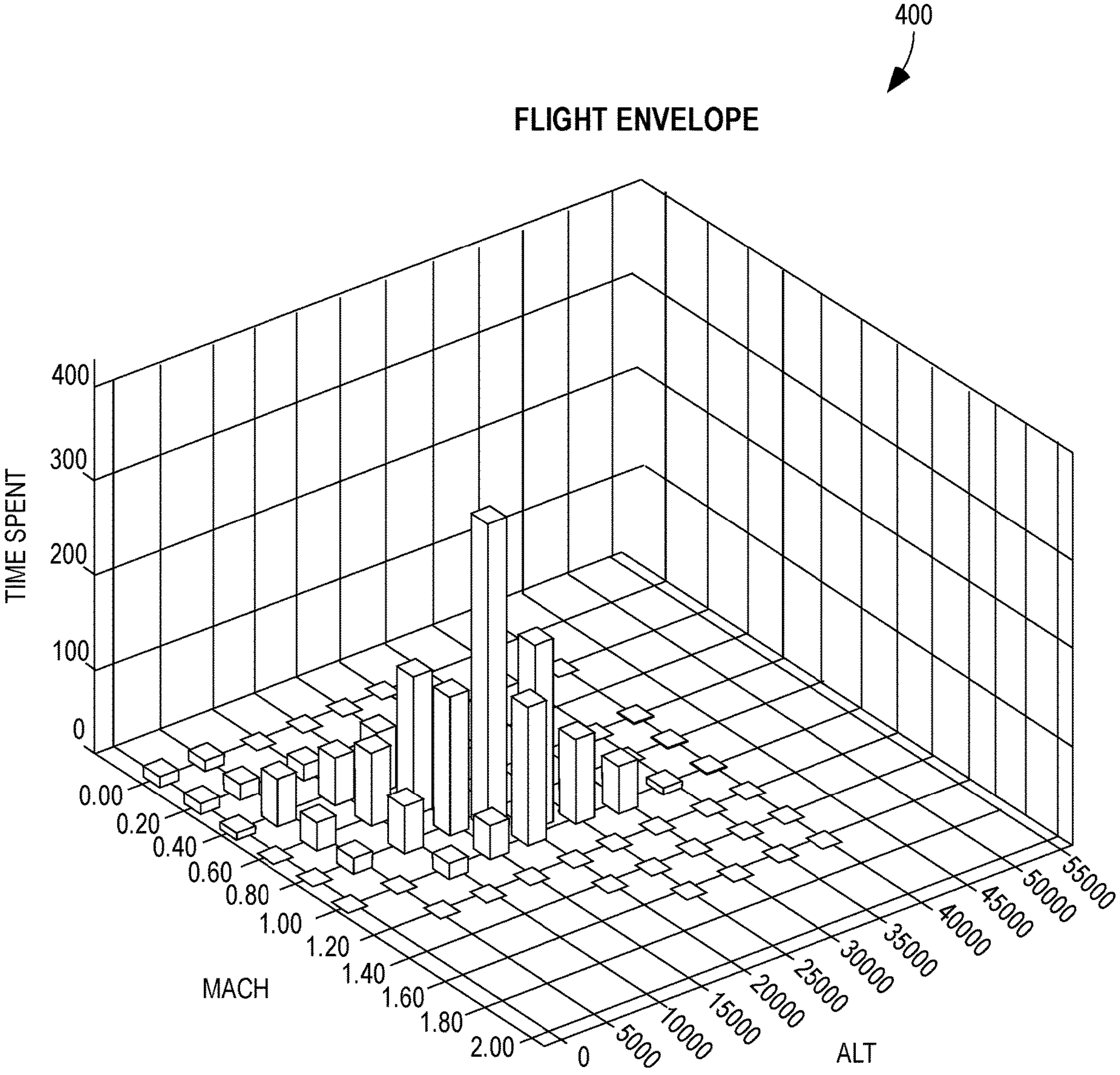
FIG. 4 comprises an exemplary graph of field analytics data in accordance with various embodiments of these teachings.

The databases 106 may house various types of data useful to probabilistic burst calculations. In some approaches, the databases 106 include field analytics data 108 and overspeed data 110 associated with the component 104. FIG. 4 illustrates how field analytics data 108 and overspeed data 110 may be combined to obtain a rotor overspeed distribution. The database 106 further includes component capability data 112 (e.g., disk capability data). It is contemplated that the databases 106 may include any type of data useful to probabilistic burst calculations.

In some approaches, the field analytics data 108 provides data describing actual operation of the engine 102 and/or the component 104. In other approaches, the field analytics data 108 describes the expected operation of the engine 102 and/or the component 104. Expected operational data may be employed, for example, for new engine or component designs or applications (e.g., putting an existing engine on a new aircraft) where actual operation data is unavailable. Thus, the field analytics data 108 may include data from actual or expected operation of the engine 102. In one example, the field analytics data 108 may be indicative of the time spent at various operating conditions (e.g., time spent at in various altitude bands and/or Mach number bands, time spent at various throttle settings), an example is shown herein in FIG. 4.

The field analytics data 108 may be collected via one or more sensors under in-field operating conditions. Such sensors may be configured to transmit the field analytics data 108 to one or more parts of the system 100 for example, to the databases 106, the engine model 114, and/or the component analysis module 116. In some embodiments, when the component 104 is a part such as the turbine disk of a gas turbine engine, a flight data monitoring system may collect data on in-field operating conditions such as Mach number, altitude, engine throttle, airspeed, flight time, etc. and may transmit the data to the system 100. The field analytics data 108 may be acquired by sensors periodically over the course of a flight, for example, about every second, about every 5 seconds, about every 10 seconds, or about every minute.

The overspeed data 110 includes data indicative of the degree of overspeed for the component 104, for example, a % overspeed for the component 104. The overspeed data 110 may indicate the percent overspeed as a function of the operating condition (e.g., percent overspeed as a function of the altitude and Mach bands). The overspeed data 110 may be derived or predicted from a model, such as engine model 114.

The component capability data 112 includes data related to the material properties of the component 104 (e.g., the turbine disk). The component capability data 112 may be derived from physics-based methods that account for material, geometry, and temperature variation. Such physics-based methods may be elastic-plastic methods, though, other suitable physics-based methods may be employed. The component capability data 112 may be in the form of a capability distribution, such as a disk capability distribution, which provides a probability the component 104 will be capable of withstanding a particular speed without burst should the speed be obtained. For example, the capability distribution may be a distribution of such a probability as a function of rotor speed.

The capability distribution may be obtained from material test data for the component 104 (e.g., the turbine disk) and may demonstrate minimum and average material capability burst analysis using minimum material capabilities or properties may result in a heavier component or a more exotic material and, accordingly, a more expensive component. Burst analysis with average (or above average) material capabilities or properties may result in a lighter component or less exotic material and, accordingly, a less expensive component. Tests may be performed on full-size components, subscale components, and/or specimens to obtain material test data. Material tests may involve extracting one or more specimen from a component forging, such as a turbine disk forging, and testing particular material properties such as yield strength, ultimate strength, fatigue, Young's modulus, etc. In some approaches, material tests may include tests for disk strength which test a turbine disk's ability to withstand a given operating speed and are function of the material properties of the turbine disk. Material properties may have a distribution determined by testing a plurality, for example tens, hundreds, or even thousands of specimens excised from component forgings. Thus, material testing may determine various material properties, including maximums, minimums, means, and standard deviations. Such properties may then be used to calculate the capability of the component 104 to withstand an overspeed event.

One or more testing devices and/or sensors may be used to perform material tests to determine the material properties used to generate the component capability distribution. In some approaches, material properties, such as yield and ultimate strengths, may be measured via a force gauge. The force gauge may include a test stand to hold the specimen and a load cell that translates the magnitude of the measured force applied to the specimen to an electrical signal that can be quantified. The test stand is configured to hold the specimen during testing and, in some approaches, includes a bottom grip or support to engage a bottom portion of the specimen and top grip or support to engage a top portion of the specimen. It is contemplated that different test stand configurations may be employed based on the size and shape of the specimen. The force gauge may collect measurements over the course of the test, during which a force is applied to the specimen, and may output peak and/or average force values which may be translated into material properties.

One or more digital image correlation (DIC) systems and/or extensometers may also be employed determine material properties used to generate the component capability distribution, for example, to monitor tensile testing on the component 104. Extensometers may measure the extension, compression, and/or shear deformation of the material specimen when a force is applied. The extensometer may include one or more grips that engage the specimen to apply a force to the specimen during testing. In certain approaches, one or more tensile test machines (e.g., an Instron testing system) may be configured to perform a variety of material tests including tensile tests, compression tests, shearing tests, fracture toughness tests, and others to measure a variety of appropriate material properties. The tensile test machines may measure the strength of specimens and determine properties such as ultimate strength, yield strength, elongation, and Young's modulus. The tensile test machines may be controlled by a testing control unit which may be in communication, for example, with the control unit 118. The testing control unit may respond to command signals received by the control unit 118 to operate the tensile test machine. Further, data collected by the tensile test machines may be transmitted to the component analysis module 116, which may be configured to generate the component capability distribution using the collected data.

The system 100 further includes an engine model 114. The engine model 114 performs control failure analysis and is configured to predict overspeed of the component 104 based on various operating conditions. For example, when the component 104 is a turbine disk, the engine model 114 may be configured to predict % overspeed values in various rotor speed bands, altitude bands, and/or Mach number bands based on actual or expected operating conditions of the engine. As used herein, "bands" refers to ranges of values for a particular parameter such as rotor speed, altitude, or Mach number. Such "bands" may help to quantify the output of the engine model 114. For example, it may be desirable to determine an amount of time the engine is operating at 15,000 rpm and what overspeed could occur at 15,000 rpm. However, the amount of time the engine spends at exactly 15,000 rpm may be close to zero. Thus, for the purpose of analysis, a rotor speed band of 15,000-15,100 rpm may be employed to provide a quantifiable, non-zero value. The engine model 114 may generate a probability of overspeed as a function of over-speed control logic, accurate worst-case speed determination (e.g., shaft separation, loss of load), and field experience based on legacy engine experience.

In some approaches, the engine model 114 is a Numerical Propulsion System Simulation (NPSS) cycle model. The NPSS model may predict various parameters about the internal conditions of an engine such as pressures, temperatures, and flow rates. The NPSS model may model a gas turbine engine or a hybrid electric engine. The NPSS cycle model may model, for example, engine control system failure and/or single point failure to predict conditions that result in overspeed and the extent to which overspeed occurs under such conditions. Inputs to the NPSS model maybe, for example, altitude, Mach number and a power parameter such as power level angle (PLA) or rotor speed. Rotor overspeed may also be determined from the NPSS model by PLA. There may be a plurality of outputs generated by the NPSS model, several of which may be employed in a calculation of burst probability. One example output of the engine model 114 is overspeed data 110, such as an overspeed value and/or rotor speed. The engine model 114 models failure conditions of the engine control system and/or single point failure of the component 104 to generate a prediction of the amount of overspeed. In some approaches, the output of the engine model 114 is an overspeed value for the component 104 as a function of operating conditions (e.g., Mach number, altitude). It is contemplated that the overspeed may be for the component 104 itself or for another part or device coupled to the same shaft as the component 104. For example, when the component 104 is a high-pressure turbine disk in a gas turbine engine, the engine model 114 may generate an overspeed value applicable to the entire high-pressure system as a function of Mach number and altitude.

Figure 3:
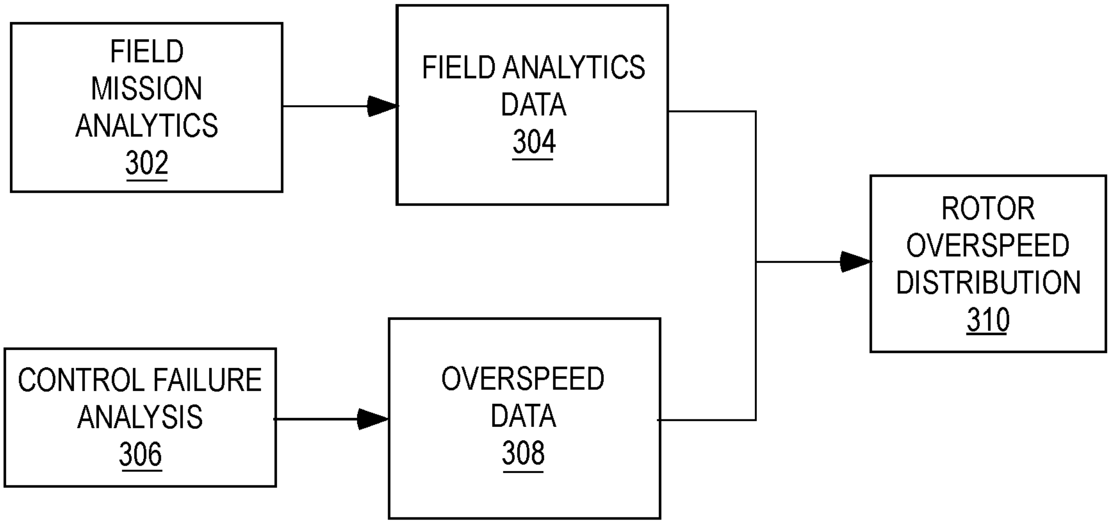
FIG. 3 comprises a flow diagram of an exemplary approach for determining a rotor overspeed distribution in accordance with various embodiments of these teachings.

The system 100 further includes a component analysis module 116. The component analysis module 116 is configured to generate an overspeed distribution for the component 104 based on the field analytics data 108 and the overspeed data 110. The component analysis module 116 is also configured to calculate a probability of burst for the component 104 based, at least in part, on the overspeed distribution. As discussed above, the component analysis module 116 may use both the overspeed distribution and the capability distribution for the component 104 to determine a probability of burst. FIG. 3 provides an overview of an exemplary calculation performed by the component analysis module 116 in order to calculate a probability of burst for the component 104. In some approaches, the component analysis module 116 is configured to integrate an overlapping area of a component capability distribution and an overspeed distribution. The component analysis module 116 may automatically perform an integration of these two distributions to generate a probability of burst for the component 104.

It is contemplated that, in some embodiments, one or more components of the system 100 may be in communication with an engine control system. For example, the output of the component analysis module 116 or one or more signals indicative thereof may be transmitted to the engine control system. In this manner, the engine control system may be configured to drive engine controls based on an output of the component analysis module 116, such as the probability of burst. In one approach, for example, rather than driving engine controls based on exceeding a particular overspeed value (e.g., exceeding 10% overspeed), the engine control system could drive engine controls based on the probability of burst. As discussed herein, the probability of burst may be a function of flight profile data such as Mach number and altitude. Further, it is contemplated that the engine control system may use such probabilistic burst information, as determined by the component analysis module 116, to expand operating limits during particular situations, for example, offline or in real-time. For example, the probabilistic burst calculations may be used to adjust the limits at which various levels of control are implemented by the engine control system.

The control unit 118 may function as a computing device to perform the functions and methods described herein. The control unit 118 may include one or more processors 120, input/output (I/O) devices 122, transceivers 124, and memory devices 126. The processors 120 may include any suitable processing device such as a microprocessor, microcontroller, integrated circuit, logic device, or other suitable processing device. The processors 120 may be used to execute or assist in executing the steps of the processes, methods, functionality and techniques described herein, and to control various communications, decisions, programs, content, listings, services, interfaces, logging, reporting, etc. Further, the one or more processors 120 may access the memory devices 126, which may store instructions 130, code and the like that are implemented by the processors 120 to implement intended functionality.

The memory devices 126 typically include one or more processor-readable and/or computer-readable media accessed by at least the processors 120 and may include volatile and/or nonvolatile media, such as RAM, ROM, EEPROM, flash memory and/or other memory technology. Further, the memory devices 126 are shown as internal to the control unit 118; however, the memory devices 126 may be internal, external or a combination of internal and external memory. Similarly, some or all of the memory devices 126 can be internal, external or a combination of internal and external memory of the processors 120. The memory devices 126 may be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory devices 126 may store data 128 such as code, software, executables, scripts, data, content, lists, programming, programs, log or history data, engine information, component information, and the like. While FIG. 1 illustrates the various components being coupled together via a bus, it is understood that the various components may actually be coupled to the control unit 118 and/or one or more other components directly.

Typically, the control unit 118 further includes one or more communication interfaces, ports, or transceivers 124 and the like allowing the control unit 118 to communicate over a communication bus, a distributed computer, and/or a communication network (e.g., a local area network (LAN), the Internet, wide area network (WAN), etc.) with other devices and/or other such communications or combinations of two or more such communication methods. Further, the transceivers 124 may be configured for wired, wireless, optical, fiber optical cable, satellite, or other such communication configurations or combinations of two or more such communications.

The I/O devices 122 may be any relevant port or combinations of ports, such as but not limited to USB, Ethernet, or other such ports. The I/O devices 122 may be configured to allow wired and/or wireless communication coupling to external components. For example, the I/O devices 122 may provide wired communication and/or wireless communication (e.g., Wi-Fi, Bluetooth, cellular, RF, and/or other such wireless communication), and in some instances may include any suitable wired and/or wireless interfacing device, circuit and/or connecting device, such as but not limited to one or more transmitters, receivers, transceivers, or combination of two or more of such devices.

As illustrated in FIG. 1, the various components of the system 100 may communicate directly or indirectly, such as over one or more distributed communication networks, such as a network 132. For example, the network 132 may include LAN, WAN, Internet, cellular, Wi-Fi, and other such communication networks or combinations of two or more such networks.

In operation, the system 100 may be used to calculate probabilistic burst for the component 104, for example, for a turbine disk. The engine model 114 may generate overspeed data 110 including overspeed values for specified Mach number bands and altitude bands. In some approaches, the overspeed data 110 may be stored in the databases 106. The component analysis module 116 receives the overspeed data 110. In some approaches, the component analysis module 116 receives the overspeed data 110 from the databases 106. However, it is also contemplated that the overspeed data 110 may be received directly from the engine model 114 or from other sources.

The component analysis module 116 also receives field analytics data 108. In some approaches, the component analysis module 116 may receive field analytics data 108 from the one or more databases 106, however it is also contemplated that the component analysis module 116 may receive the field analytics data 108 from other sources. The component analysis module 116 then generates a rotor overspeed distribution based on both the field analytics data 108 and the overspeed data 110. The details of an exemplary calculation performed by the component analysis module 116 to obtain the rotor overspeed distribution are described with reference to FIGS. 4-8.

The component analysis module 116 also receives component capability data 112, for example, a capability distribution. The component analysis module 116 then uses the rotor overspeed distribution, in combination with the component capability data 112 to calculate the probability of burst for the component. Such probabilistic burst calculations may be employed to determine whether a component such as a turbine disk meets design limitations. It is also contemplated that the probabilistic burst calculations described herein may provide a designer with a wider range of design choices for a component with respect to material of construction, mating hardware connections, and manufacturing processes.

Figure 2:
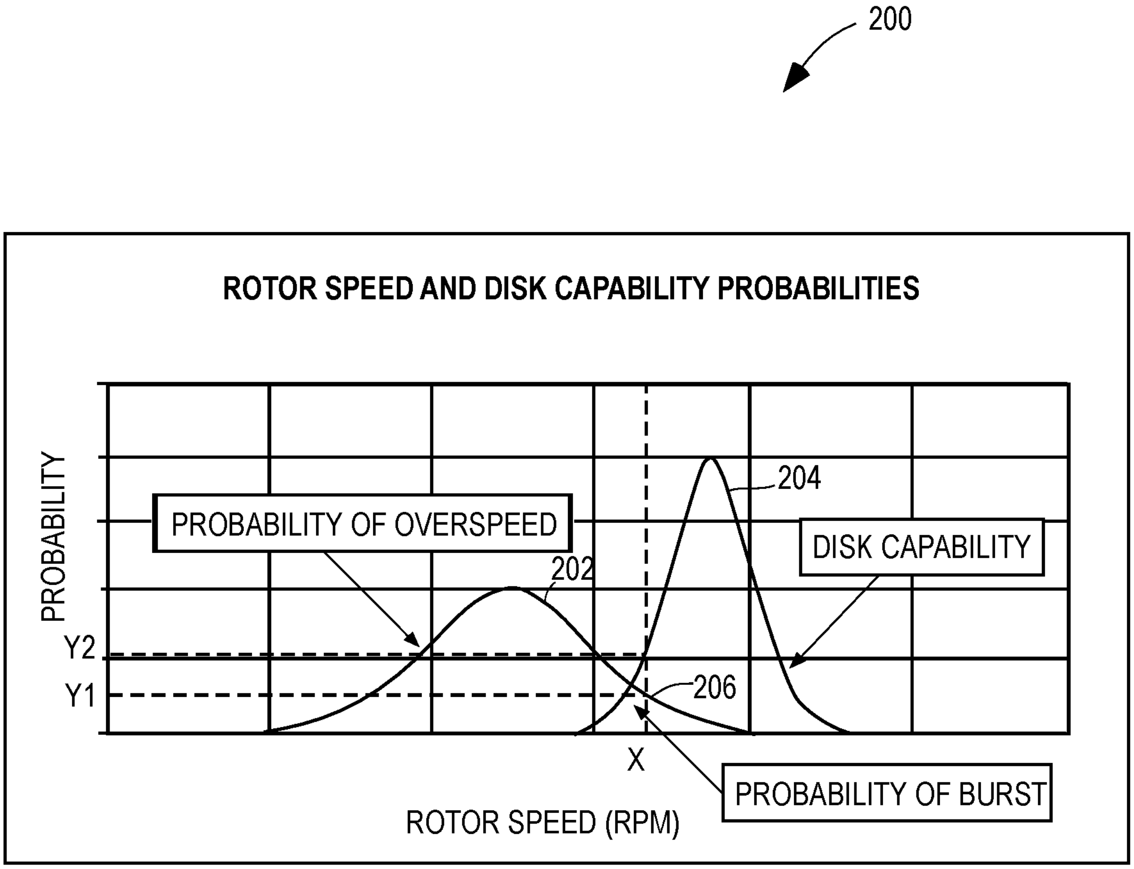
FIG. 2 comprises a graph of a probabilistic approach for calculating burst for a component in accordance with various embodiments of these teachings.

FIG. 2 illustrates a probabilistic approach for calculating burst for a component where the component is a turbine disk. The approach utilizes a rotor overspeed distribution 202 and a disk capability distribution 204. The rotor overspeed distribution 202 provides the probability that the turbine disk will reach overspeed (e.g., a probability of overspeed) as a function of the rotor speed. The disk capability distribution 204 provides the probability the turbine disk will withstand a particular speed without burst as a function of the rotor speed. The overlapping region 206 of the rotor overspeed distribution 202 and the disk capability distribution 204 determines the probability of burst for the turbine disk.

Turning to FIG. 3, an exemplary approach for determining a rotor overspeed distribution 310 for a component, in particular, a turbine disk of a gas turbine engine is illustrated. One or more of the types of data in FIG. 3 may be housed in the databases 106 of the system 100. It is contemplated that one or more of the types of data illustrated in FIG. 3 may also be obtained from other sources and, in some approaches, may be transmitted directly to or from the control unit 118, the engine model 114, and/or the component analysis module 116. The approach in FIG. 3 utilizes two data sets that may be combined to define the rotor overspeed distribution 310 (i.e., the probability distribution of rotor overspeed).

The first data set includes field analytics data 304. The field analytics data 304 is obtained from field mission analytics 302. Field mission analytics 302 may include flight data from actual engine operation and can be evaluated to determine an amount of time spent in various operating conditions, for example, an amount of time spent in various altitude bands and/or Mach number bands. In some approaches, the field analytics data 304 that is indicative actual engine operation may be recorded, for example, via one or more on-board sensors or via one or more engine control systems. For example, the on-board sensors may be configured to record altitude, Mach number, or any other parameters of a flight profile. The sensors may record parameters as a function of time to provide a flight profile that reflects how the parameters change over time. Field mission analytics 302 may also include flight data from expected engine operation, for example, for new engines designs or new engine applications. One or more expected flight profiles may be provided for a new engine design. Such expected flight profiles may provide expected altitudes and expected Mach numbers for when the new engine design is in operation. For example, one such expected flight profile (which may also be referred to as a field mission) may include how altitude and Mach number change with time over the course of a flight employing the new engine design. Thus, field mission analytics 302, from actual engine operation, may not be required to determine field analytics data 304 for the turbine disk to obtain the rotor overspeed distribution 310.

The second data set includes overspeed data 308. The overspeed data 308 may be obtained from a control failure analysis 306. Control failure analysis 306 may be performed by an engine model, such as the engine model 114 of the system 100. As discussed above, the engine model 114 may be an NPSS model. The control failure analysis 306 predicts rotor speed values (e.g., rotor rpms) and/or rotor overspeed values (e.g., percent overspeed) based on various operating conditions of the engine. Such operating conditions may be any operation conditions that are part of an actual or expected flight profile. In some approaches, the control failure analysis 306 predicts rotor speed values and/or rotor overspeed values based on the altitude and/or Mach numbers obtained during actual or expected engine operation.

The field analytics data 304 and the overspeed data 308 are combined to determine the rotor overspeed distribution 310 for the turbine disk. The component analysis module 116 may combine the field analytics data 304 and the overspeed data 308 to determine the rotor overspeed distribution 310. An exemplary approach for obtaining the rotor overspeed distribution 310 is described in further detail with reference to FIG. 7.

With reference to FIG. 4-7, exemplary graphs relating to generating a rotor overspeed distribution are illustrated. The graphs provide one approach for how field analytics data 304 and overspeed data 308 may be combined to generate a rotor overspeed distribution.

FIG. 4 illustrates exemplary field analytics data in the form of a flight envelope. The graph 400 provides time data from field missions analytics that includes operating conditions (e.g., full flight data) from an actual aircraft and gas turbine engine operation. The graph 400 displays the time spent (in seconds) at various Mach numbers and altitudes while the gas turbine engine was in flight. The field analytics data is evaluated to determine time spent in each Mach number and altitude band.

Figure 5:
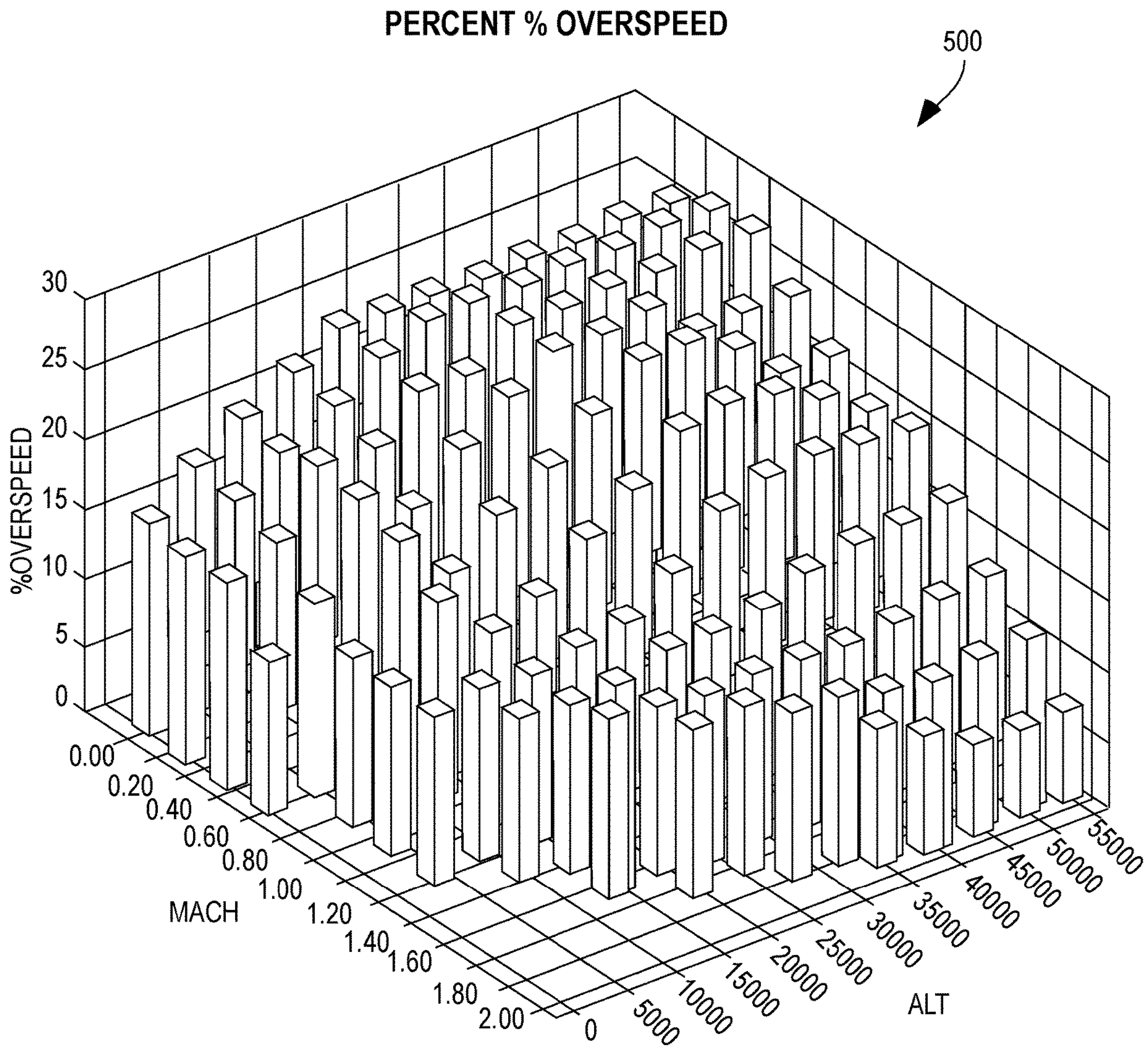
FIG. 5 comprises an exemplary graph of overspeed data in accordance with various embodiments of these teachings.

FIG. 5 illustrates exemplary overspeed data in the form of percent (%) overspeed. The graph 500 provides data from an engine model, such as the engine model 114 of the system 100, that predicts overspeed based on Mach number and altitude band. The graph 400 displays the percent overspeed value as a function of Mach number and altitude.

Figure 6:
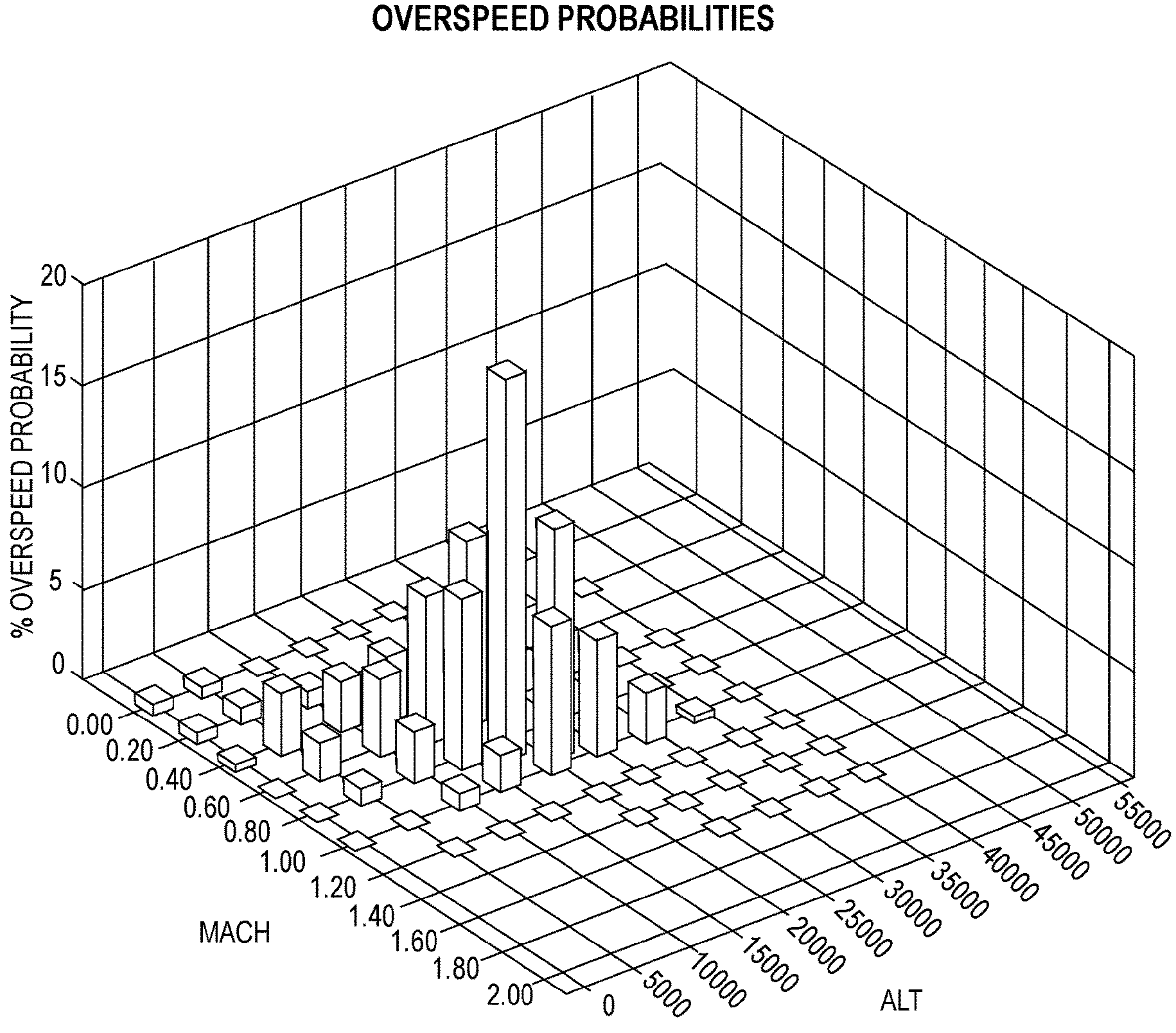
FIG. 6 comprises an exemplary graph of probability of overspeed in accordance with various embodiments of these teachings.

FIG. 6 combines the time data set from graph 400 and the overspeed data set from graph 500 to define the probability distribution of rotor overspeed. The graph 400 illustrates the probability of overspeed as a function of Mach number and altitude. If an overspeed event is assumed to have occurred, FIG. 6 identifies the probability it occurred at the indicated Mach number and altitude conditions.

Figure 7:
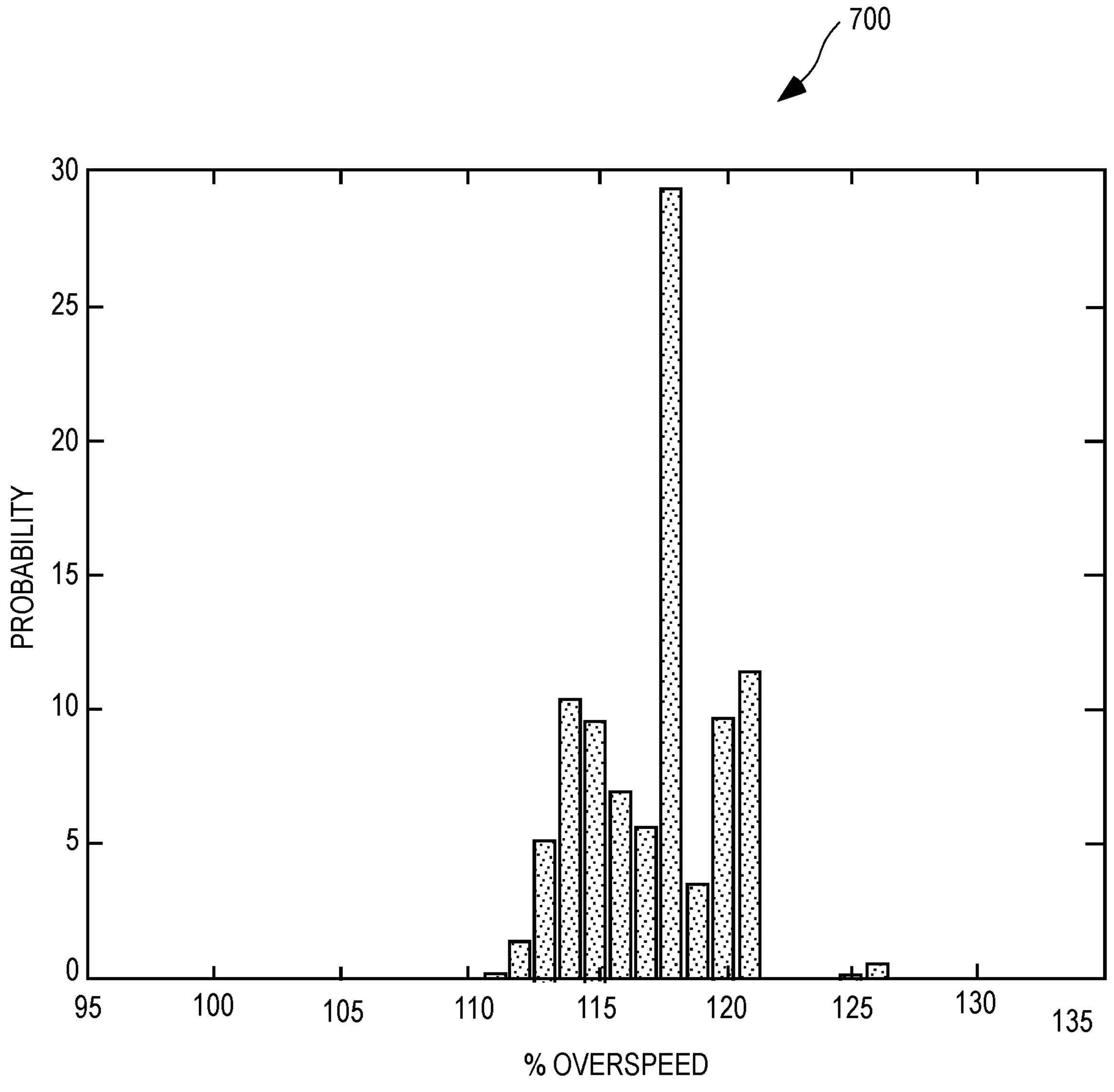
FIG. 7 comprises an exemplary graph of a rotor overspeed distribution in accordance with various embodiments of these teachings.

FIG. 7 illustrates an exemplary rotor overspeed distribution 700. The rotor overspeed distribution 700 depicts probability of overspeed as a function of the % overspeed value. For example, the following steps may be used to identify the probability of 15% overspeed (Note that a band of 15-16% is used to identify Mach number/altitude conditions of interest) shown in FIG. 7:

(a) identify all of the Mach number and altitude bands where the % overspeed is 15% using the % overspeed data in FIG. 5;

(b) sum the time spent in each of the identified Mach number and altitude bands where the % overspeed is 15% using the field analytics data of FIG. 4 to obtain a total sum of time spent at 15% overspeed; and (c) divide the total sum of time spent at 15% overspeed by the total time spent in all operating conditions.

To further clarify, FIG. 7 is established by repeating steps (a) through (c) above for each possible % overspeed from FIG. 5.

Figure 8:
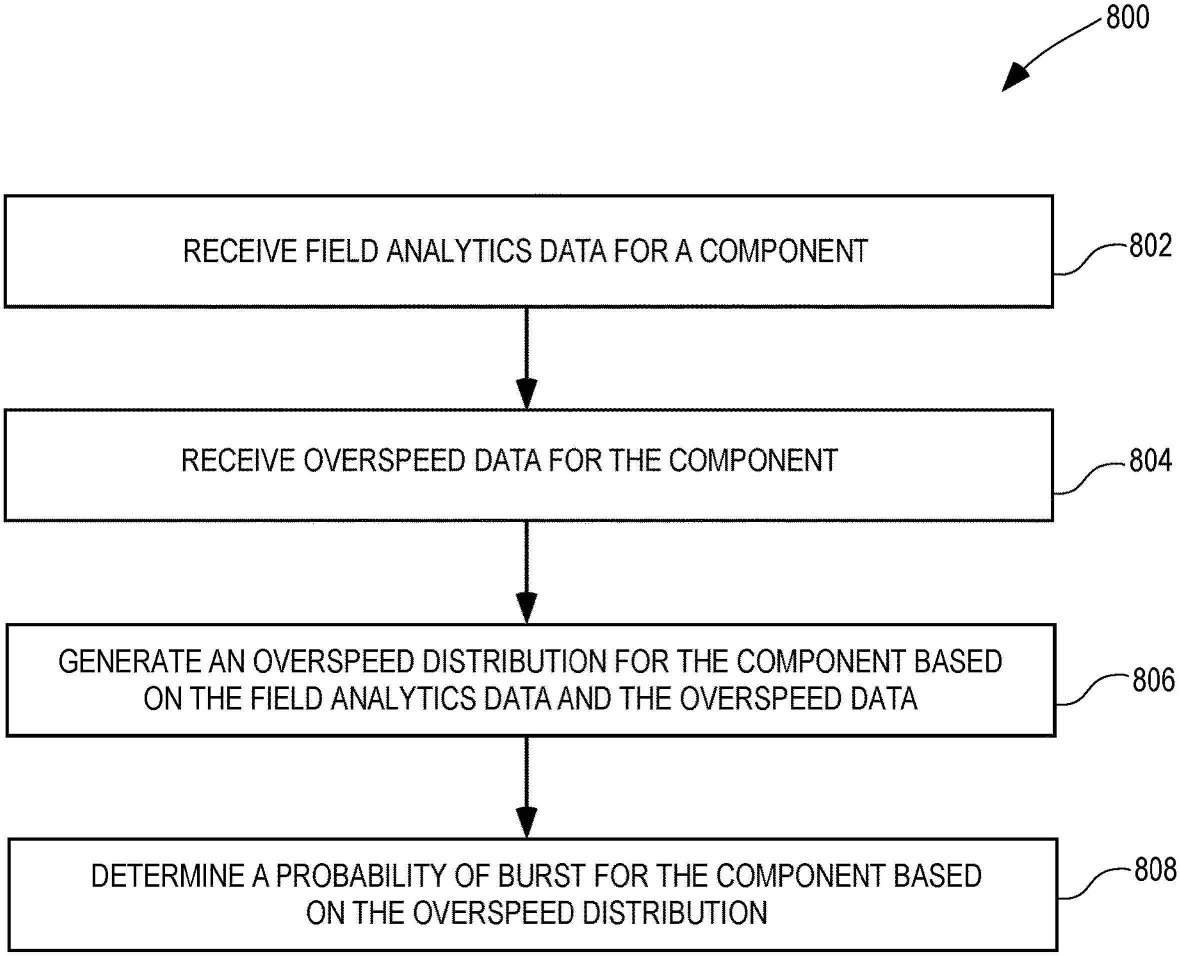
FIG. 8 comprises a flow diagram in accordance with various embodiments of these teachings.

Turning to FIG. 8, a method 800 of calculating the probability of burst for the component 104 is illustrated. The method 800 may be performed by the system 100 described with reference to FIG. 1 or by portions thereof.

The method 800 includes receiving 802 field analytics data for a component. The field analytics data is indicative of the time the component spends at overspeed as a function of the at least one operating condition of the component. The method also includes receiving 804 overspeed data, such as data that is indicative of the % overspeed of the component as a function of the at least one operating condition.

The method 800 also includes generating 806 a rotor overspeed distribution for the component based on the field analytics data and the % overspeed data. The method 800 may optionally further include determining the probability of burst for the component based on the overspeed distribution. By some approaches, determining 808 the probability of burst may involve both the rotor overspeed distribution and a capability distribution for the component for example, as described above with reference to FIG. 2.

In some embodiments, the method 800 may further include adjusting at least one design parameter for the component based on the probability of burst. Further, the method 800 may include sending or otherwise transmitting one or more signals indicative of the rotor overspeed distribution and/or the probability of burst. Such a signal may be transmitted, for example, to an engine control system or to a graphical user interface (GUI) so that the overspeed distribution and/or the probability of burst or a visual representation thereof may be displayed.

In some embodiments, the method may also include deploying the component based on the probability of burst. In this manner, the probability of burst may be used to determine whether a component design meets a particular design standards. For example, an industry design standard may indicate that the probability of burst must be below a predetermined threshold value for the component design to be employed in a particular type of aircraft or engine. Thus, when there are multiple designs that may be employed in an engine, the probability of burst may indicate which of the designs are suitable for use in the engine. It is also contemplated that the probability of burst may be used to determine whether a manufactured component is fit for service and may be installed in an engine. Thus, the probability of burst may also be used to determine which manufactured parts are suitable to be placed in service.

Deploying the component may include, for example, assigning or otherwise associating an identifier (ID) with the component. Such an ID may be a pass/fall, yes/no, or other indication that a design complies with industry standards or that a manufactured component is suitable to be placed in service. For example, a control unit or a processor (such as the control unit 118 or the processor 120 depicted in FIG. 1) may assign an ID to a component design based on the probability of burst. In some approaches, deployment of the component based on the probability of burst may be based on a score or grade assigned to the component. The score may be generated based on the probability of burst and may be indicative of how the component will perform under overspeed conditions or a design margin, e.g., a degree by which the component design exceeds what is required by design standards. For example, the system 100 may score or grade the component based on the probability of burst.

Further aspects of the disclosure are provided by the subject matter of the following clauses:

A system for determining probabilistic burst for a component, the system comprising: at least one processor that integrates an overlapping area of at least two distributions; and a non-transitory memory device, the non-transitory memory device storing instructions that when executed by the at least one processor causes the at least one processor to perform operations, the at least one processor configured to: receive field analytics data indicative of time the component spends in at least one operating condition; receive overspeed data indicative of overspeed values for the component as a function of the at least one operating condition; generate an overspeed distribution for the component based on the field analytics data and the overspeed data, the overspeed distribution providing a probability of overspeed as a function of overspeed value; determine a probability of burst for the component by integrating an overlapping area between the overspeed distribution and a component capability distribution; and deploy the component based on the probability of burst.

The system of any preceding clause, wherein the component capability distribution is indicative of a likelihood that the component will withstand a particular speed without burst.

The system of any preceding clause, wherein the probability of burst for the component is determined by integrating the overlapping area of the component capability distribution and the overspeed distribution.

The system of any preceding clause, wherein the at least one processor is configured to generate the overspeed distribution by: identifying, based on the overspeed data, at least one particular operating condition where the component is at a particular overspeed value; summing, based on the field analytics data, an amount of time the component spends at the at least one particular operating condition to obtain a total amount of time spent at the at least one particular operating condition; and divide the total amount of time spent at the at least one particular operating condition by a total amount of time spent at all operating conditions.

The system of any preceding clause, wherein the field analytics data is indicative of an amount of time the component spends at one or more overspeed values as a function of the at least one operating condition of the component.

The system of any preceding clause, wherein the component is a turbine disk in a gas turbine engine or a part of a hybrid electric engine.

The system of any preceding clause, wherein the field analytics data is acquired from at least one sensor associated with the gas turbine engine or the hybrid electric engine.

The system of any preceding clause, wherein the overspeed data is derived from a model of a control system or a point failure in the gas turbine engine.

The system of any preceding clause, wherein the at least one operating condition includes at least one of Mach number or altitude.

The system of any preceding clause, wherein the overspeed data is obtained from a model of the component in failure conditions, the model predicting overspeed values as a result of a control system failure or a point failure of the component; and wherein the model predicts an overspeed value of the component as a function of the at least one operating condition of the component.

A computer-implemented method comprising: executing, by a processor configured to integrate an overlapping area of at least two distributions, the executing including: receiving, by the processor, field analytics data indicative of an amount of time a component spends in at least one operating condition; receiving, by the processor, overspeed data indicative of overspeed values for the component as a function of the at least one operating condition; generating, by the processor, the overspeed distribution for the component based on the field analytics data and the overspeed data, the overspeed distribution providing a probability of overspeed of the component as a function of an overspeed value; determining, by the processor, a probability of burst for the component by integrating an overlapping area between the overspeed distribution and a component capability distribution; and deploying the component based on the probability of burst.

The computer-implemented method of any preceding claim, wherein the component capability distribution is indicative of a likelihood that the component will withstand a particular speed without burst.

The computer-implemented method of any preceding claim, wherein the field analytics data provides an amount of time the component spends at the at least one operating condition as a function of the at least one operating condition.

The computer-implemented method of any preceding claim, wherein the component is a turbine disk in a gas turbine engine or a part of a hybrid electric engine.

The method of any preceding clause, wherein the field analytics data is acquired from at least one sensor associated with the gas turbine engine or the hybrid electric engine.

The computer-implemented method of any preceding claim, wherein the at least one operating condition includes at least one of Mach number and altitude.

The computer-implemented method of any preceding claim, further comprising, predicting, via at least one model of the component, the overspeed value of the component.

The computer-implemented method of any preceding claim, wherein the at least one model predicts a probability of overspeed for the component as a function of the at least one operating condition.

The computer-implemented method of any preceding claim, wherein the at least one model predicts the probability of overspeed based on modeling control system failure or point failure of the component.

The computer-implemented method of any preceding claim, wherein method further includes: receiving, by the processor, a capability distribution associated with the component, the capability distribution providing a probability that the component will be capable of withstanding a particular speed without burst; wherein the probability of burst for the component is further based on the capability distribution.

The computer-implemented method of any preceding claim, further including: adjusting at least one design parameter for the component based on the probability of burst.

A computer-implemented method comprising: executing, by a processor configured to integrate an overlapping area of a component capability distribution and an overspeed distribution for a component, the component capability distribution providing a probability the component with withstand a particular overspeed value without burst, the executing including: receiving, by the processor, field analytics data indicative of an amount of time a component spends in at least one operating condition; receiving, by the processor, overspeed data indicative of overspeed values for the component as a function of the at least one operating condition; generating, by the processor, the overspeed distribution for the component by combining the field analytics data and the overspeed data, the overspeed distribution providing a probability of overspeed of the component as a function of overspeed value; and determining, by the processor, a probability of burst for the component based on an integration of the overlapping area; and deploying the component when the probability of burst falls below a predetermined threshold.

What is claimed is:

1. A system for determining probabilistic burst for a component, the system comprising:

at least one processor configured to integrate an overlapping area of at least two distributions; and a non-transitory memory device, the non-transitory memory device storing instructions that when executed by the at least one processor cause the at least one processor to:

receive field analytics data from at least one sensor associated with an aircraft, the field analytics data indicative of time the component spends in at least one operating condition, the field analytics data acquired under in-field operating conditions over the course of a flight of the aircraft;

receive overspeed data indicative of overspeed values for the component as a function of the at least one operating condition;

generate an overspeed distribution for the component based on the field analytics data and the overspeed data, the overspeed distribution providing a probability of overspeed as a function of overspeed value;

determine a probability parameter for the component by integrating an overlapping area between the overspeed distribution and a component capability distribution; and deploy the component based on the probability parameter.

2. The system of claim 1, wherein the component capability distribution is indicative of a likelihood that the component will withstand a particular speed without burst.

3. The system of claim 1, wherein the at least one sensor is configured to record an operational parameter of the engine as a function of time to generate a flight profile, and wherein the field analytics data includes the flight profile.

4. The system of claim 2, wherein the at least one processor is configured to generate the overspeed distribution by: identifying, based on the overspeed data, at least one particular operating condition where the component is at a particular overspeed value; summing, based on the field analytics data, an amount of time the component spends at the at least one particular operating condition to obtain a total amount of time spent at the at least one particular operating condition; and divide the total amount of time spent at the at least one particular operating condition by a total amount of time spent at all operating conditions.

5. The system of claim 1, wherein the component is a turbine disk in a gas turbine engine or a part of a hybrid electric engine.

6. The system of claim 5, wherein the at least one sensor is associated with the gas turbine engine or the hybrid electric engine.

7. The system of claim 5, wherein the overspeed data is derived from a model of a control system or a point failure in the gas turbine engine.

8. The system of claim 5, wherein the at least one operating condition includes at least one of Mach number or altitude.

9. The system of claim 1, wherein the overspeed data is obtained from an engine model, the engine model predicting overspeed values as a result of a control system failure or a point failure of the component; and wherein the engine model predicts an overspeed value of the component as a function of the at least one operating condition of the component.

10. A computer-implemented method comprising:

executing, by a processor configured to integrate an overlapping area of at least two distributions, the executing including:

receiving, by the processor, field analytics data indicative of an amount of time a component of an engine of an aircraft spends in at least one operating condition, the field analytics data acquired from at least one sensor over the course of a flight of the aircraft;

receiving, by the processor, overspeed data indicative of overspeed values for the component as a function of the at least one operating condition;

generating, by the processor, an overspeed distribution for the component based on the field analytics data and the overspeed data, the overspeed distribution providing a probability of overspeed of the component as a function of an overspeed value;

determining, by the processor, a probability parameter for the component by integrating an overlapping area between the overspeed distribution and a component capability distribution; and the method further comprising installing the component in a particular type of aircraft or engine based on the probability parameter.

11. The computer-implemented method of claim 10, wherein the component capability distribution is indicative of a likelihood that the component will withstand a particular speed without burst.

12. The computer-implemented method of claim 10, wherein the at least one sensor is configured to record an operational parameter of the engine as a function of time to generate a flight profile, and wherein the field analytics data includes the flight profile.

13. The computer-implemented method of claim 12, wherein the component is a turbine disk in a gas turbine engine or a part of a hybrid electric engine.

14. The computer-implemented method of claim 13, wherein the at least one sensor is associated with the gas turbine engine or the hybrid electric engine.

15. The computer-implemented method of claim 10, further comprising, predicting, via an engine model, the overspeed value of the component.

16. The computer-implemented method of claim 15, wherein the engine model predicts a probability of overspeed for the component as a function of the at least one operating condition.

17. The computer-implemented method of claim 16, wherein the engine model predicts the probability of overspeed based on modeling control system failure or point failure of the component.

18. The computer-implemented method of claim 10, wherein the method further includes:

receiving, by the processor, the component capability distribution, the component capability distribution providing a probability that the component will be capable of withstanding a particular speed without burst.

19. The computer-implemented method of claim 10, further including:

adjusting at least one design parameter for the component based on the probability parameter.

20. A computer-implemented method comprising:

executing, by a processor configured to integrate an overlapping area of a component capability distribution and an overspeed distribution for a component, the component capability distribution providing a probability the component will with withstand a particular overspeed value without burst, the executing including:

receiving, by the processor, field analytics data indicative of an amount of time a component of an engine of an aircraft spends in at least one operating condition, the field analytics data received from at least one sensor over the course of a flight of the aircraft;

receiving, by the processor, overspeed data indicative of overspeed values for the component as a function of the at least one operating condition;

generating, by the processor, the overspeed distribution for the component by combining the field analytics data and the overspeed data, the overspeed distribution providing a probability of overspeed of the component as a function of overspeed value; and determining, by the processor, a probability parameter for the component based on an integration of the overlapping area; and adjusting controls for an engine via an engine control system based on the probability parameter.

* * * * *